Dec. 15, 1931.   L. FENNER   1,836,231
EDUCATIONAL DEVICE
Filed Nov. 22, 1928
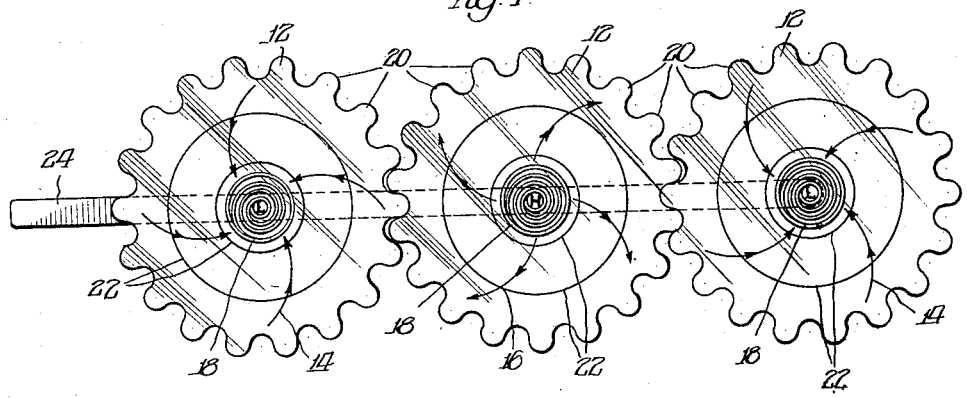
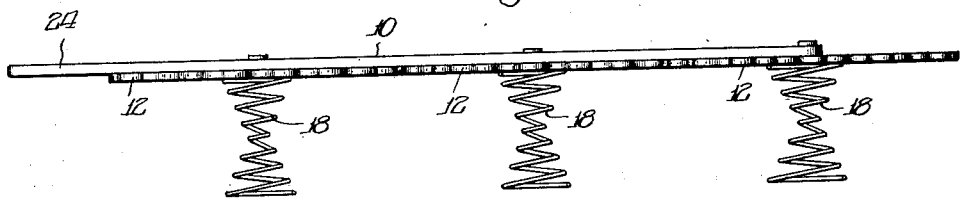
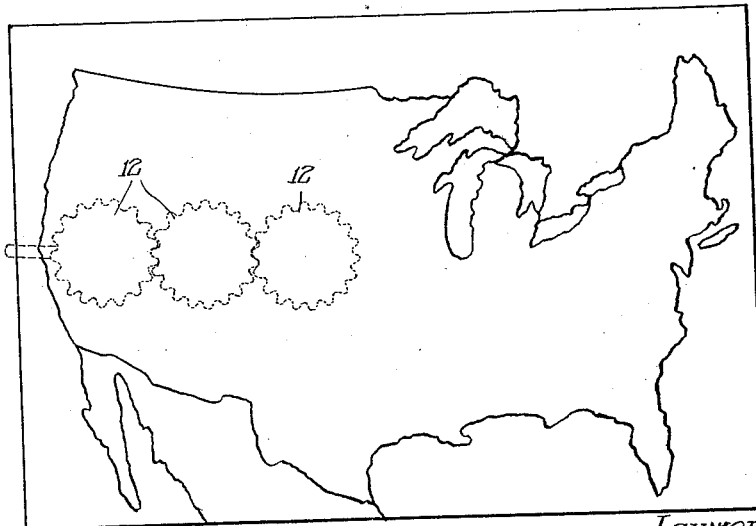
Inventor:
Lawrence Fenner, Patented Dec. 15, 1931

UNITED STATES PATENT OFFICE

LAWRENCE FENNER, OF CHICAGO, ILLINOIS

EDUCATIONAL DEVICE

Application filed November 22, 1928. Serial No. 321,119.

This invention relates to educational devices and has for an important object thereof the provision of means for illustrating the formation and operation of cyclonic and anti-cyclonic winds.

The manner in which winds are actually formed in nature is in fact relatively simple as contrasted with the modern methods that are employed in schools for teaching this subject matter to pupils. Charts, diagrams, maps, and the like, bearing complicated markings thereon are employed and the student studies these publications in the light of accompanying printed matter and endeavors to picture simultaneously the rotation of winds, the movement of pressure areas, the location and function of various isobars, etc. This method of learning or endeavoring to learn climatic conditions is confusing and in many instances fails to impart to the student a satisfactory knowledge of the subject.

On the other hand, the value of illustrating devices that may be used in school rooms for the purpose of placing before the student an actual representation or picturization of matters of geography, physics, biology, botany, and the like, bring about a simplification of study and teaching that is extremely desirable and often results in giving a comprehensive knowledge of the subject to a student who otherwise would be unable to cope successfully with the complicated matter.

Accordingly, an important feature of the present invention consists in the provision of a device that is simple in design and construction and is adapted for use in conjunction with a map to illustrate the movement of winds in the various regions of the country. In the illustrated embodiment of the invention the device is of light weight and may be used by the instructor holding the device in his hand and moving it manually across the surface of a map. In order that the pupils or students may not be confused by the fact that the device is superimposed upon the map, it is contemplated making the major parts of the device of a transparent material which will permit the students to gaze through the parts and see the terrain of the map therebeneath.

Another feature of the invention consists in the provision of means associated with the device for pictorially representing the direction of movements of the winds during the time they are being formed and after they have been completely formed. Since it is well-known that winds in high pressure areas move differently from winds in low pressure areas, the invention contemplates coloring differently or otherwise distinguishing the indicia for picturizing the formed winds in high pressure areas from the indicia representing the winds in low pressure areas.

Another feature of the invention consists in the provision of indicia for indicating the places in low pressure areas and in high pressure areas that are of equal barometric pressure. Still another feature of the invention resides in the construction of the device which permits facile and simple manipulation thereof.

Additional objects and features of the invention will become apparent from a reading of the following specification in the light of the accompanying drawings, in which—

Figure 1 is a plan view of an educational device embodying the invention;

Figure 2 is a view in side elevation of the device shown in Figure 1; and

Figure 3 is a diagrammatic view showing the manner in which the device is used in connection with an ordinary map.

As a matter of geography, it is known that wherever barometric pressures are unequal, winds are the result. Generally, in an area of high pressure the heavy air settles downwardly toward the earth and thence flows outwardly in a direction generally away from the center of the high pressure area to form what are known as anti-cyclonic winds. These winds flow outwardly in the manner described and flow into adjacent low pressure areas in which they join the upward rise of air in the low pressure areas, and they move at the same time toward the center of the low pressure area thereby causing what are commonly known as cyclonic winds. In this connection, it is to be understood that the are not always strong and ... storms which are popu... cyclones should, in fact, be called ... us, we see that in areas of unequal barometric pressures the horizontal direction of flow is, we may say for purposes of this discussion, in opposite directions as compared to the center of the areas, and in addition to this difference in horizontal flow there is a similar difference in the direction of vertical flow. In cyclonic winds, the air moves spirally upward as it moves in toward the center of a low pressure area and in high pressure areas it moves spirally downward before and as it moves away from the center of the area.

And so in illustrating the formation and operation of cyclonic winds, it is necessary to illustrate several factors: First, areas of relatively high and relatively low barometric pressure; second, the horizontal direction of flow of the winds in the various pressure areas; third, the vertical direction of flow of such winds; and fourth, the rotary or spiraling character of the winds. In addition to the foregoing climatic elements, others may if desired be portrayed, as, for example, the educational device may be provided with isobars for indicating places of equal barometric pressure.

Keeping in mind the foregoing explanation of the formation of cyclonic and anti-cyclonic winds and the various climatic factors that must be portrayed in order adequately to illustrate the formation of such winds, and now turning to the drawings which show one embodiment of a device for making such a display, the reference numeral 10 indicates a base upon which there is mounted a series of disks 12 of any desired or convenient number. It will be observed that at the center of each of the disks 12 there appears the letter "L" or "H" which represents respectively areas of low barometric pressure and areas of high barometric pressure, it further being observed that the low and high pressures are alternately arranged. The disks or members 12 which represent, for example, low pressure areas, are provided with indicia in the form of arrows 14 which point inwardly to indicate the fact that the winds in the low pressure areas flow in a direction toward the center of the area as contrasted with arrows 16 applied to the high pressure area disks which illustrate that winds in the high pressure areas flow in an outward direction away from the center of the area.

Inasmuch as the cyclonic and anti-cyclonic winds in the different pressure areas have a vertical flow as well as a horizontal flow, the device herein illustrated is provided with spirally wound members 18 which represent graphically the vertical movement of the air, and to the end of portraying the fact that the vertical movement of the air in low pressure areas is upwardly, whereas in high pressure areas it is downwardly, the invention contemplates constructing the spirally wound members in such a manner that they distinguish from one another. A convenient manner of carrying out this feature consists in painting the members 18 that occupy low pressure areas and high pressure areas respectively of different colors.

From so much of the description as has already been given will be seen that the device is provided with indicia for illustrating the horizontal and vertical flow of winds in both high and low pressure areas. Inasmuch as the winds spiral during the time they are moving inwardly and upwardly, or downwardly and outwardly, the invention contemplates providing the peripheries of the disk 12 with teeth 20 which interengage one another and cause rotation imparted to the first disk to be transmitted to the remaining disks. This thing of rotating the disks is also characteristic and descriptive of the fact that the winds in high pressure areas spiral in a direction opposite to the winds in low pressure areas, for, as will be seen from an inspection of Figure 1, the low pressure area disks rotate in the same direction, but in a direction opposite to the rotation of the high pressure disk. As illustrated, the members or disks 12 are additionally provided with indicia 22 commonly known as isobars for indicating localities in the various pressure areas that are of the same barometric pressure.

It is a geographical fact that high and low pressure areas advance in a procession across a territory causing winds and rains and various other climatic changes in that territory. In the United States, the pressure areas generally advance from the West coast toward the East with high and low pressure areas being, of course, alternately arranged, and it is in order to illustrate this alternate arrangement of the pressure areas that a plurality of disks are provided in the device.

In using the device to illustrate not only the formation of winds in the various areas, but also the progression of the areas across the terrain, it is contemplated providing a wall map and superimposing the educational device upon the map, holding the device by means of a handle 24 formed on the outer extremity of the base 10, and to advance the device manually across the map somewhat as illustrated in Figure 3. During the time the device is being so advanced the instructor manually rotates one of the disks 12 which results in similar rotation being imparted to the remaining disks and the formation and operation of the winds is thereby completely illustrated. The manual movement of the device across the surface of the map represents the advancement of alternately arranged high and low pressure areas across the country; the arrows illustrate the respective inward and outward flow of winds in the various areas; the spirally wound members 18 display the respective vertical movement of the winds in the various areas; and, the rotation of the members pictorially represents the spiraling of the winds during their formation and operation. During use the device may be held so that the spiral members 18 (not shown in Fig. 3) are directed away from the map.

By means of the device herein described, together with the employment of methods commonly practiced today the students may be taught the effect of temperatures in high and low pressure areas and how to make weather forecasts or predictions in accordance with the simple methods that are generally employed today. Thus, to the student may be explained that the chief reason for rain or snow about a low pressure area is that the inflow of rising air expands and is cooled and so gives up some of its moisture, and also that in anti-cyclonic winds the descending air comes from an altitude where the air is colder than that at the bottom of the region and hence brings a low temperature. Similarly, that winds from anti-cyclones generally bring clear weather, but cold air moving downward and out of an anti-cyclone may mingle with warm air about it so as to cause some of the moisture of the latter to condense giving rise to clouds or even to precipitation.

To simplify the use of the device in the school room, the various disks may, if so desired, be made of some transparent material as, for example, celluloid, for when so constructed the student may gaze through the disk and at the map, or he may study the indicia that is borne by the disks.

It is to be recognized and understood that various changes and modifications may be made in this invention such, for example, as changes in the shapes of the disks and the means for transmitting rotation between them; in the elimination or addition of indicia for illustrating climatic factors; of the mounting for the disks; etc., but in no instances will such changes constitute departures from the scope of the invention as set forth in the appended claims.

Having thus described my invention, what I claim as new and desire to secure by United States Letters Patent, is:

1. An educational device adapted to be employed in connection with a map for illustrating climatic conditions, comprising, a series of members arranged to portray relatively high and relatively low pressure areas, and pointers carried by the members for illustrating the direction of flow of winds in the high and low pressure areas, said members being mounted for rotary movement.

2. An educational device adapted to be employed in connection with a map for illustrating climatic conditions, comprising, a plurality of members mounted for rotation and adapted to represent areas of relatively high and relatively low pressure and indicia carried by the members for picturizing the direction of flow of winds in the different pressure areas.

3. An educational device adapted to be employed in connection with a map for illustrating climatic conditions, comprising, a plurality of members mounted for rotation and adapted to represent areas of relatively high and relatively low pressure and means carried by the members for representing both the horizontal and vertical direction of flow of winds in the different pressure areas.

4. An educational device for illustrating climatic conditions, comprising, a base having a handle thereon and a plurality of rotary disks composed of transparent material mounted on the base, the peripheries of said disks being so constructed and arranged that rotary movement imparted to one disk is transmitted to an adjacent disk, and means carried by the upper surfaces of the disks for representing graphically the direction of flow of winds and other similar climatic factors.

5. An educational device for illustrating climatic conditions, comprising, a base having a handle associated therewith, a plurality of rotary disks mounted upon the base and formed with interengaging toothed peripheries, indicia for illustrating high and low pressure areas stamped upon the faces of the disks, lines for illustrating points of equal barometric pressure stamped upon the face of the disk, pointers for illustrating the horizontal direction of flow of winds in the various pressure areas likewise stamped upon the faces of the disks, and separate means secured to the disks and adapted to project outwardly therefrom to illustrate the vertical direction of movement of the winds in the various pressure areas.

6. An educational device adapted to be rotated relatively to a map for illustrating climatic conditions, said device comprising a member having applied thereto means for indicating the horizontal direction of movement of winds, together with means for indicating the vertical direction of movement of winds.

Signed at Chicago, Illinois, this 19th day of November, 1928.

LAWRENCE FENNER.